Jan. 3, 1967     E. C. BITZER     3,295,665
CHAIN CATENARY BELT IDLER
Filed Nov. 24, 1964     2 Sheets-Sheet 1
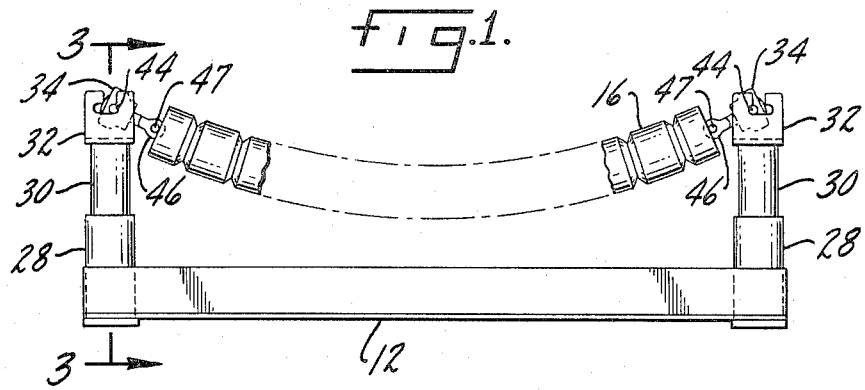
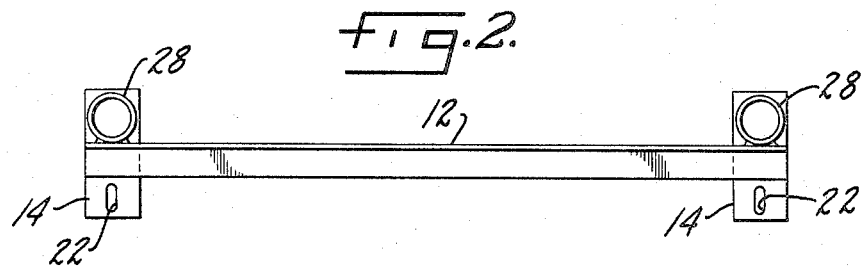
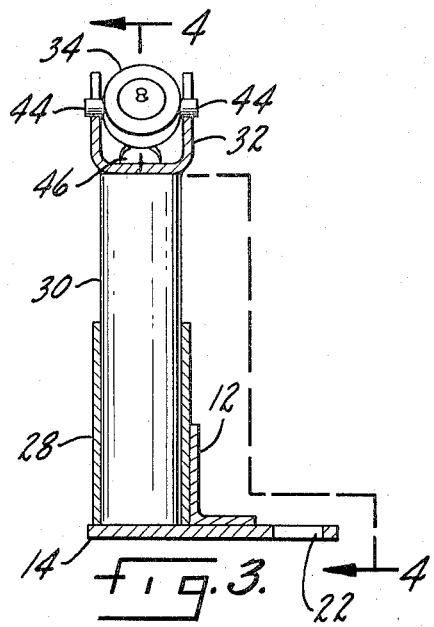
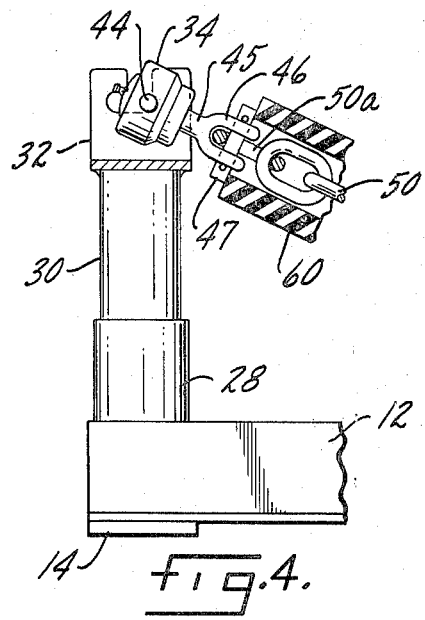
INVENTOR.
Edmund C. Bitzer,
BY Parker & Carter
Attorneys.

Jan. 3, 1967   E. C. BITZER   3,295,665
CHAIN CATENARY BELT IDLER

Filed Nov. 24, 1964   2 Sheets-Sheet 2

INVENTOR.
Edmund C. Bitzer,
BY Parker & Carter
Attorneys.

3,295,665
CHAIN CATENARY BELT IDLER
Edmund C. Bitzer, Golden, Colo., assignor to Nordberg Manufacturing Company, Milwaukee, Wis., a corporation of Wisconsin
Filed Nov. 24, 1964, Ser. No. 413,424
7 Claims. (Cl. 198—192)

My invention relates to an improvement in chain catenary belt idlers and has for one purpose to provide an improved flexible idler for supporting conveyor belts and the like.

Another purpose is to provide an idler of the type described in which the idler will support a moving belt of the type which, for example, is used in conveying minerals, ore, coal, and the like.

Another purpose is to provide a flexible idler assembly which will rotate during or in response to the movement of the belt, with a minimum of wear, belt misalignment, or the like.

Another purpose is the provision of an improved catenary belt idler in which a flexible inner member, such, for example, as a chain, rotates in unison with a flexible outer sleeve with no necessity of direct bonding or interlock between the flexible inner member or chain and the outer sleeve.

Another purpose is the provision of such an idler assembly in which a single exterior sleeve of flexible material, having the general characteristics of rubber, may be freely threaded upon a flexible internal member, which may be a chain, the flexible member extending through an inner bore in the flexible outer sleeve in which there is ample clearance between the inner and the outer members to permit easy assembly.

Another purpose is to provide a flexible idler assembly in which both the inner flexible member and the outer flexible sleeve may rotate in unison without the necessity of bonding or of interlocking the members in relation to each other.

Another purpose is to provide ready means for adjusting the points of support of the ends of the flexible member.

Other purposes will appear from time to time in the course of the specification and claims.

I illustrate the invention more or less diagrammatically in the accompanying drawings, in which:

FIGURE 1 is an elevation of my idler assembly provided with appropriate end posts;

FIGURE 2 is a top plan view of the base illustrating an adjustable upright post support bracket;

FIGURE 3 is a section on the line 3—3 of FIGURE 1, illustrating a typical upright post support unit on an enlarged scale;

FIGURE 4 is a fragmentary section on the line 4—4 of FIGURE 3;

Figure 6:
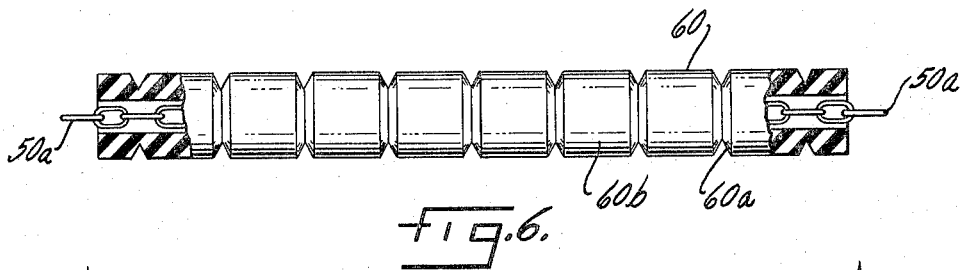
FIGURE 6 illustrates the same assembly wherein rubber tubing has been compressed longitudinally so that the end chain links protrude sufficiently for the insertion of pins or suitable locking means to maintain a longitudinal compression.
Figure 7:
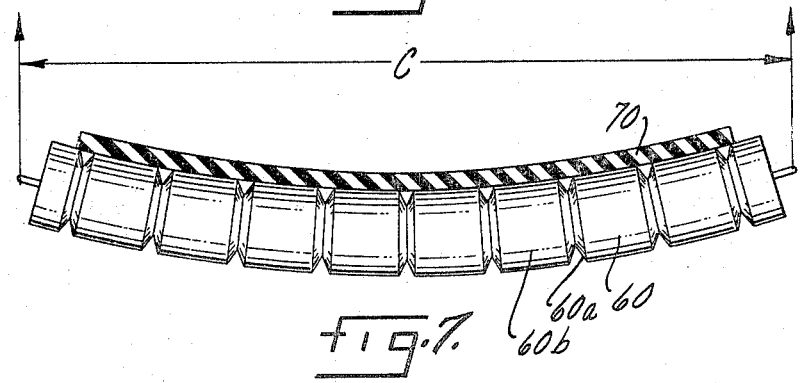
Figure 8:
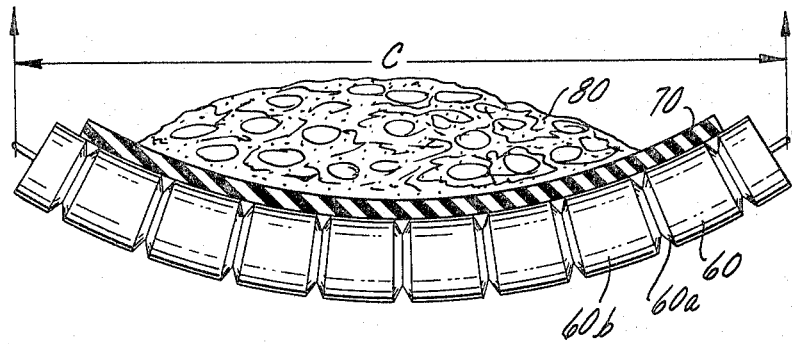

FIGURE 7 is a schematic figure illustrating the position of the assembly of FIGURE 6 when it is suspended between end posts or supports such as are shown in FIGURES 1, 3 and 4, and subjected to the weight of a conveyor belt; and FIGURE 8 illustrates the structure of FIGURES 6 and 7 with the pronounced curve or troughing of the belt due to the additional load imposed by the weight of material on the belt.

Like parts are indicated by like symbols throughout the specification and drawings.

Referring now to the drawings, and particularly to FIGURES 1 to 4, inclusive, I illustrate a flexible belt idler secured to or between end supporting posts in such fashion as to be rotatable as the belt passes over it. A frame or bottom element 12, herein shown as an angle member, carries at its opposite ends brackets 14. Transverse slots 22 located in the brackets receive any suitable fasteners which may secure the idler assembly as a whole to the side rails of any suitable conveyor frame, not shown. These slots 22 provide for suitable adjustment of the frame elements or channels 12 to the side frame elements, not shown, of the conveyor frame, so that the idlers may be adjusted to be located substantially perpendicular to the axis of movement of the belt. The brackets or supports 14 are shown as having upwardly extending cylindrical portions 28 into which vertical posts 30 may penetrate, and in which they may be rotatably adjusted. Each post 30 terminates at its upper extremity in a suitable member or clevis 32 adapted detachably to receive a suitable connector 34 on the end of the below described idler unit 16. The pin or post 30, being rotatable within the tubular portion 28, thus provides a self-aligning supporting structure for the idler unit 16. The bottom arms of the T are unequal in length, or in lateral extension from the center of the post. Thus a 180-degree rotation of the post provides an adjustment of the point of support of the end of the flexible member.

In the structure herein shown the member or connector 34, with its pins 44, has an axial stem 45 rotatable therein about an axis perpendicular to the axis of the pins 44. It terminates in a fork structure 46 through the arms of which a crosspiece or securing pin 47 may pass. The ends of the pin 47 are shown as abutting opposite sides of the edge end of the flexible tube 60, below described. The end link 50a of the chain 50 passes about and is held by the crosspiece 47.

In FIGURE 6 I illustrate end links 50a as extending outwardly beyond the ends of the outer flexible rubber or rubber-like sleeve 60, the parts being kept in the position in which they are shown, for example, by the structure above described and illustrated in FIGURE 4. One way of assembling my idler units is to employ an outer member 60 and a chain 50 of substantially the same length. By then subjecting the sleeve 60 to endwise compression, the end links 50a are caused to extend outwardly beyond the ends of 60, being held by the crosspieces 47. The sleeve 60 may be channeled circumferentially as at 60a to provide what are, in effect, individual, although connected, idler rollers 60b.

Whatever form of connector is employed, I wish, in effect, to have a universal connection for each end of the idler chain. Thus the chain may freely rotate in response to the movement of a belt thereacross. Such a belt is illustrated at 70, for example, in FIGURES 7 and 8, and a load 80, as shown in FIGURE 8, will trough the flexible idler and the belt downwardly as shown. However, the idler is still freely rotatable in its end supports.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

Figure 5:
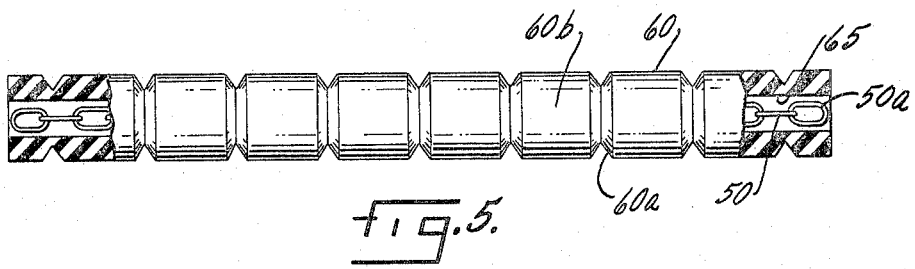
FIGURE 5 illustrates a length of heavy walled tube of rubber or suitable rubber substitute, with parts in axial section, a flexible member, in this instance a chain, being illustrated in the bore of the tube.

The use and operation of the invention are as follows:

The drawings illustrate a length of heavy walled tubing of rubber or the like 60 which has a central or axial bore 65. One method of assembling an idler in accordance with my invention consists in providing a length of chain which may be initially of about the same length as the tube. This relationship between the chain length 50 and the tube 60 is illustrated in FIGURE 5. Clearly, the chain may be made somewhat longer than as shown in FIGURE 5, or even slightly shorter. What is essential is that I maintain a loose fit between the chain and the tube, and that, in connection with the assembly of the idler, will subject the tube 60 to endwise compression, and, while it is in its compressed state, I secure its ends to the chain, as shown in FIGURE 4. It will be understood that I provide a sufficient end extension of the chain at each end of the tube 60 to permit it to be secured rotatably in some suitable fashion to the upper ends of the post structure illustrated in FIGURES 1, 3 and 4. It is essential that the chain rotate freely with the belt, and, of course, that the tube 60 rotate freely with the chain. The pins or securing elements 47 prevent the rubber from returning to its normal length and, as a result, the chain is subjected to a small tensile stress equal to the force exerted by the tubing in attempting to regain its original length. Resulting from this compression the outside diameter of the tubing and the inside diameter of the bore increase slightly, and no physical bond exists between the chain and the outer sleeve. However, they rotate in unison due to the force acting on the chain through the pins 47 passing through the end links. The rubber in the reduced sections formed by the V-shaped grooves 60a in the tubing is under a compressive stress. This assists the rubber to withstand alternate compressive and tensile stress as when it is rotated in the catenary curve, as indicated in FIGURES 7 and 8. It should be kept in mind that a chain suspension constitutes the only means for approaching a tube catenary curve as this is mathematically defined. A link chain with individual links free for relative flexure presents the nearest practical approach to a completely flexible element, which is one of the elements of the catenary curve. All that inhibits complete flexibility is the slight friction between adjacent links.

In my structure, as above described, the end links, or a suitable extension therefrom, are journaled for rotation in relation to the members 34. The details of the bearing means do not of themselves form part of the present invention, but I illustrate a practical structure. It will be understood, of course, that when the belt 70 carries a load this load causes a more pronounced curve or troughing of the belt, due to the weight of the material on the belt. The degree of curve or troughing will vary with the amount of load, which, in practice, is a desirable operating characteristic. The center distance between the supports of the rotating assembly is normally fixed by the design of the supporting structure or end posts. This distance is represented by the distance indicated at C in FIGURES 7 and 8. Means may be provided for varying this distance in order to obtain a more pronounced troughing curve.

Considering the practical conditions of operation, the belt 70 should ideally travel in a direction exactly perpendicular to the longitudinal axis of the idler assembly. This is rarely the case in actual operation, because conveyor support structures are prefabricated, and the bolt holes for locating the idler support frames are located and punched in advance. In assembly, slight misalignments are unavoidable, and if the idler is not installed almost exactly perpendicular to the direction of belt travel the belt tends to exert an appreciable thrust on the surface of the idler. Such a side thrust may operate in either direction, depending upon the direction of misalignment. I therefore prefer to provide adequate means, as herein described, for adjusting the axis of the idler assembly in relation to the long axis or length of the belt. I wish also to emphasize that as long as the fit between the rubber or rubber-like tubing 60 and the chain 50 is loose, the tubing, and particularly the reduced sections at the grooves 60a, will remain in compressive stress, which substantially eliminates the tendency of the material to tear between the sections.

Whereas I prefer to employ the combination of an outer flexible tube and an inner freely flexible chain, with the ends of the tube under compression, it will be understood that it is possible to depart somewhat from this preferred structure. For example, with the use of a flexible cable structure, free within the bore of an outer sleeve, I may obtain a substantial advantage by subjecting the ends of the tube to compression and then securing the tube, while maintaining the compression, to the flexible cable.

Since it is desirable to provide adjustment of the attachment points at the ends of the flexible member or chain. I find it advantageous to employ rotatably reversible securing members 32, with their T-shaped slots and bottom arms of unequal length. Thus the point of attachment of the chain to its support may be varied by a rotation of the member 30 in its upright, internally cylindrical socket 28.

I claim:

1. A catenary belt idler for supporting conveyor belts and the like, which includes an outer sleeve of a flexible material having the general characteristics of rubber and having a generally axial aperture therethrough, and a flexible internal support for said outer sleeve, together with means for securing the ends of the outer sleeve to the flexible internal support while maintaining the outer sleeve under endwise compression.

2. The structure of claim 1 characterized by and including the employment of a chain as the flexible internal support.

3. The structure of claim 1 characterized by and including rotatable bearing means for the ends of the chain whereby the belt idler may be rotatably mounted between end supports for rotation during movement of a belt thereover.

4. The structure of claim 1 characterized in that the outer sleeve is circumferentially channeled to provide a plurality of distinct belt engaging roller portions.

5. A catenary belt idler for supporting conveyors and the like, which includes an outer sleeve of a flexible material having the general characteristics of rubber and having a generally axial aperture therethrough, and a flexible internal support for said outer sleeve, said flexible support being initially of no greater length than the outer sleeve, and means for securing the ends of the outer sleeve to the flexible internal support, while maintaining the outer sleeve under endwise compression and thereby providing an extension of the flexible internal support outwardly beyond each end of the outer sleeve, and supporting connections for each end of the flexible internal support, said connections being sufficiently close to permit a downward bowing of the catenary belt idler during use.

6. A chain catenary belt idler for supporting conveyor belts and the like which includes an outer sleeve of a flexible material having the general characteristics of rubber and having a generally axial aperture extending from end to end therethrough, and a flexible internal support for said outer sleeve including a chain, and adjustable means for supporting the ends of the chain while permitting flexure of the chain under the weight of a belt, said means including a reversible securing element to which the chain is secured, a reversible holding element mounted, at an end of the chain, for rotation about a generally upright axis, said element having chain securing surfaces located at different distances from the axis of the holding element, whereby a rotation of the holding element about an arc of the order of 180 degrees provides a different securing location for the chain end.

7. The structure of claim 6 characterized in that the holding element is formed with an upwardly open T-slot having lower arms terminating at different distances from the axis of the holding element.

References Cited by the Examiner

UNITED STATES PATENTS

| | | | |
|---|---|---|---|
| 2,876,890 | 3/1959 | Baechli | 198—192 |
| 3,126,090 | 3/1964 | Bitzer | 198—192 |
| 3,166,184 | 1/1965 | Boyd | 198—192 |

FOREIGN PATENTS

| | | |
|---|---|---|
| 744,915 | 1/1944 | Germany. |
| 534,044 | 2/1941 | Great Britain. |

EVON C. BLUNK, *Primary Examiner.*

R. E. KRISHER, *Examiner.*

A. C. HODGSON, *Assistant Examiner.*